(12) United States Patent
D'Onofrio et al.

(10) Patent No.: US 10,805,154 B2
(45) Date of Patent: Oct. 13, 2020

(54) SECURE CONFIGURATION MANAGEMENT SYSTEM

(71) Applicants: Nicholas M. D'Onofrio, Newington, CT (US); Monika L. Kraus, Harwinton, CT (US); Deborah A. Roberts, Litchfield, CT (US); Stephen Whitlock, Westfield, NJ (US)

(72) Inventors: Nicholas M. D'Onofrio, Newington, CT (US); Monika L. Kraus, Harwinton, CT (US); Deborah A. Roberts, Litchfield, CT (US); Stephen Whitlock, Westfield, NJ (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 16/161,267

(22) Filed: Oct. 16, 2018

(65) Prior Publication Data

US 2020/0119983 A1    Apr. 16, 2020

(51) Int. Cl.
*G06F 15/16* (2006.01)
*H04L 12/24* (2006.01)
(Continued)

(52) U.S. Cl.
CPC ............ *H04L 41/0806* (2013.01); *G06F 8/60* (2013.01); *H04L 41/0609* (2013.01); *H04L 41/0853* (2013.01); *H04L 41/0859* (2013.01); *H04L 41/0866* (2013.01); *H04L 41/0886* (2013.01); *H04L 41/0893* (2013.01); *H04L 41/5054* (2013.01); *H04L 63/1433* (2013.01); *H04L 63/1441* (2013.01); *H04L 67/34* (2013.01)

(58) Field of Classification Search
CPC ............ H04L 41/0806; H04L 41/0609; H04L 41/0853; H04L 41/0859; H04L 41/0866; H04L 41/0886; H04L 41/0893; H04L 41/5054; H04L 63/1433; H04L 63/1441; H04L 67/34; G06F 8/60
USPC ........................................................ 709/220
See application file for complete search history.

(56) References Cited

U.S. PATENT DOCUMENTS 8,341,005 B2    12/2012   Ramachandran
9,727,320 B2 *   8/2017   DeHaan .................... G06F 8/60
(Continued)

*Primary Examiner* — Melvin H Pollack
(74) *Attorney, Agent, or Firm* — Buckley, Maschoff & Talwalkar LLC

(57) ABSTRACT

According to some embodiments, a configuration benchmark data store may include a plurality of secure configuration benchmarks. A back-end configuration management computer server may retrieve one of the secure configuration benchmarks and provision, by an orchestration engine, an initial operating system build in accordance with the retrieved secure configuration benchmark and an automation template. The back-end configuration management computer server may then apply, by a provisioning tool, enterprise-specific modifications to the initial operating system build to create an environment compliant with an enterprise standard benchmark. The back-end configuration management computer server may validate the enterprise standard benchmark via secure configuration and vulnerability checks, apply at least one configuration update to the enterprise standard benchmark to create a service instance, and then apply application code to the service instance.

14 Claims, 13 Drawing Sheets

(51) Int. Cl.
*H04L 29/08* (2006.01)
*H04L 29/06* (2006.01)
*G06F 8/60* (2018.01)

(56) References Cited

U.S. PATENT DOCUMENTS

| | | | |
|---|---|---|---|
| 9,804,901 B2* | 10/2017 | Gambardella | H04L 65/80 |
| 9,813,318 B2* | 11/2017 | Iyoob | H04L 43/08 |
| 9,985,953 B2* | 5/2018 | Koushik | H04L 63/0807 |
| 10,019,677 B2* | 7/2018 | Gill | G06Q 10/063 |
| 10,031,735 B2 | 7/2018 | Baset et al. | |
| 10,038,719 B2* | 7/2018 | Grosskopf | H04L 67/10 |
| 10,083,481 B2* | 9/2018 | Futch | G06Q 40/025 |
| 10,152,211 B2* | 12/2018 | Koushik | H04L 63/10 |
| 10,158,654 B2* | 12/2018 | Hamdi | G06F 11/3466 |
| 10,177,974 B2* | 1/2019 | Garcia | H04L 41/0896 |
| 10,177,998 B2* | 1/2019 | Parandehgheibi | G06F 16/24578 |
| 10,243,819 B1* | 3/2019 | Chheda | H04L 41/0883 |
| 10,257,217 B2* | 4/2019 | Hamdi | G06F 7/24 |
| 10,425,282 B2* | 9/2019 | Jacquin | H04L 63/123 |
| 10,445,089 B2* | 10/2019 | Regmi | G06F 8/61 |
| 10,567,417 B1* | 2/2020 | Dinning | H04L 63/1441 |
| 2006/0025985 A1 | 2/2006 | Vinberg et al. | |
| 2007/0005320 A1 | 1/2007 | Vinberg et al. | |
| 2015/0339263 A1* | 11/2015 | Abu El Ata | G06Q 10/06 703/2 |
| 2016/0034830 A1* | 2/2016 | Moore | G06Q 10/0635 705/7.28 |
| 2016/0140466 A1* | 5/2016 | Sidebottom | G06Q 10/0635 705/7.28 |
| 2017/0006135 A1* | 1/2017 | Siebel | G06F 8/10 |
| 2018/0075379 A1* | 3/2018 | Menezes | G06N 5/022 |
| 2018/0295154 A1* | 10/2018 | Crabtree | G06N 20/00 |
| 2018/0309747 A1* | 10/2018 | Sweet | G06F 21/56 |
| 2018/0375892 A1* | 12/2018 | Ganor | G06F 3/04847 |
| 2019/0068622 A1* | 2/2019 | Lin | G06F 9/45558 |
| 2019/0097907 A1* | 3/2019 | Nickolov | H04L 43/0817 |
| 2019/0102280 A1* | 4/2019 | Caldato | H04L 67/10 |
| 2019/0213686 A1* | 7/2019 | McLaughlin | G06Q 40/08 |
| 2019/0265971 A1* | 8/2019 | Behzadi | G06F 8/10 |
| 2019/0312800 A1* | 10/2019 | Schibler | H04L 41/0869 |
| 2019/0319987 A1* | 10/2019 | Levy | G06F 21/6218 |
| 2019/0327271 A1* | 10/2019 | Saxena | G06N 20/00 |
| 2019/0342172 A1* | 11/2019 | Bower, III | H04L 41/0803 |
| 2019/0349426 A1* | 11/2019 | Smith | H04L 67/104 |
| 2020/0090088 A1* | 3/2020 | Arora | G06Q 10/0637 |

\* cited by examiner

SECURE CONFIGURATION MANAGEMENT SYSTEM

BACKGROUND

In some cases, an enterprise may want to maintain and utilize a number of different software components. For example, the components may be associated with applications that the enterprise uses to facilitate sales, provide customer support, etc. Moreover, the enterprise may want to update, modify, patch, etc. various components as appropriate to create a "build" of a software system. For example, the enterprise might want to patch security vulnerabilities, improve performance of a software configuration, etc. Note that increased cloud provisioning and automation may require treating "infrastructure as code" and code management processes may be required to ensure sustainable operations. Such code management processes may improve version management, ensure that only approved configuration specifications are employed for Infrastructure as a Service ("IaaS") and Platform as a Service ("PaaS") implementations, etc.

To implement this type of code management process, an enterprise Information Technology ("IT") department might manually review and select appropriate updates and patches. Such an approach may be impractically time consuming, especially when there are a substantial number of updates and/or a substantial number of changes that need to be made to a baseline configuration (e.g., an enterprise may need to make thousands of such changes to software code modules to support evolving business requirements).

It would therefore be desirable to provide systems and methods to automatically facilitate implementation of a secure configuration management strategy in a way that results in an accurate and efficient management of multiple versions, modifications, patches, etc. and that allows flexibility and effectiveness when new builds are requested and/or updates are made to the system.

SUMMARY OF THE INVENTION

According to some embodiments, systems, methods, apparatus, computer program code and means to automatically facilitate implementation of a secure configuration management strategy in a way that results in an accurate and efficient management of multiple versions, modifications, patches, etc. (and that allows flexibility and effectiveness when new builds are requested and/or updates are made to the system) may be provided. In some embodiments, a configuration benchmark data store may include a plurality of secure configuration benchmarks. A back-end configuration management computer server may retrieve one of the secure configuration benchmarks and provision, by an orchestration engine, an initial operating system build in accordance with the retrieved secure configuration benchmark and an automation template. The back-end configuration management computer server may then apply, by a provisioning tool, enterprise-specific modifications to the initial operating system build to create an environment compliant with an enterprise standard benchmark. The back-end configuration management computer server may validate the enterprise standard benchmark via secure configuration and vulnerability checks, apply at least one configuration update to the enterprise standard benchmark to create a service instance, and then apply application code to the service instance.

Some embodiments comprise: means for retrieving, from a configuration benchmark data store including a plurality of secure configuration benchmarks, one of the secure configuration benchmarks; means for provisioning an initial operating system build in accordance with the retrieved secure configuration benchmark and an automation template; means for applying enterprise-specific modifications to the initial operating system build to create an environment compliant with an enterprise standard benchmark; means for validating the enterprise standard benchmark via secure configuration and vulnerability checks; means for applying at least one configuration update to the enterprise standard benchmark to create a service instance; and means for applying application code to the service instance.

In some embodiments, a communication interface associated with a back-end configuration management computer server exchanges information with remote devices. The information may be exchanged, for example, via public and/or proprietary communication networks.

Technical effects of some embodiments of the invention are improved and computerized ways to facilitate implementation of a secure configuration management strategy in a way that results in an accurate and efficient management of multiple versions, modifications, patches, etc. and that allows flexibility and effectiveness when new builds are requested and/or updates are made to the system. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of information definition by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks, and subsystems. For example, in the present invention an automated, secure configuration management strategy may be implemented, thus improving the overall performance of the system associated with an enterprise (e.g., by improving security and reducing configuration errors). Moreover, embodiments associated with automatic coordination might further improve communication network performance, user interactions, programming (e.g., by reducing conflicts associated with code builds that would require additional network access), etc. In addition, embodiments may improve software code development for an enterprise by coordinating updates to a substantial number of software components.

Figure 1:
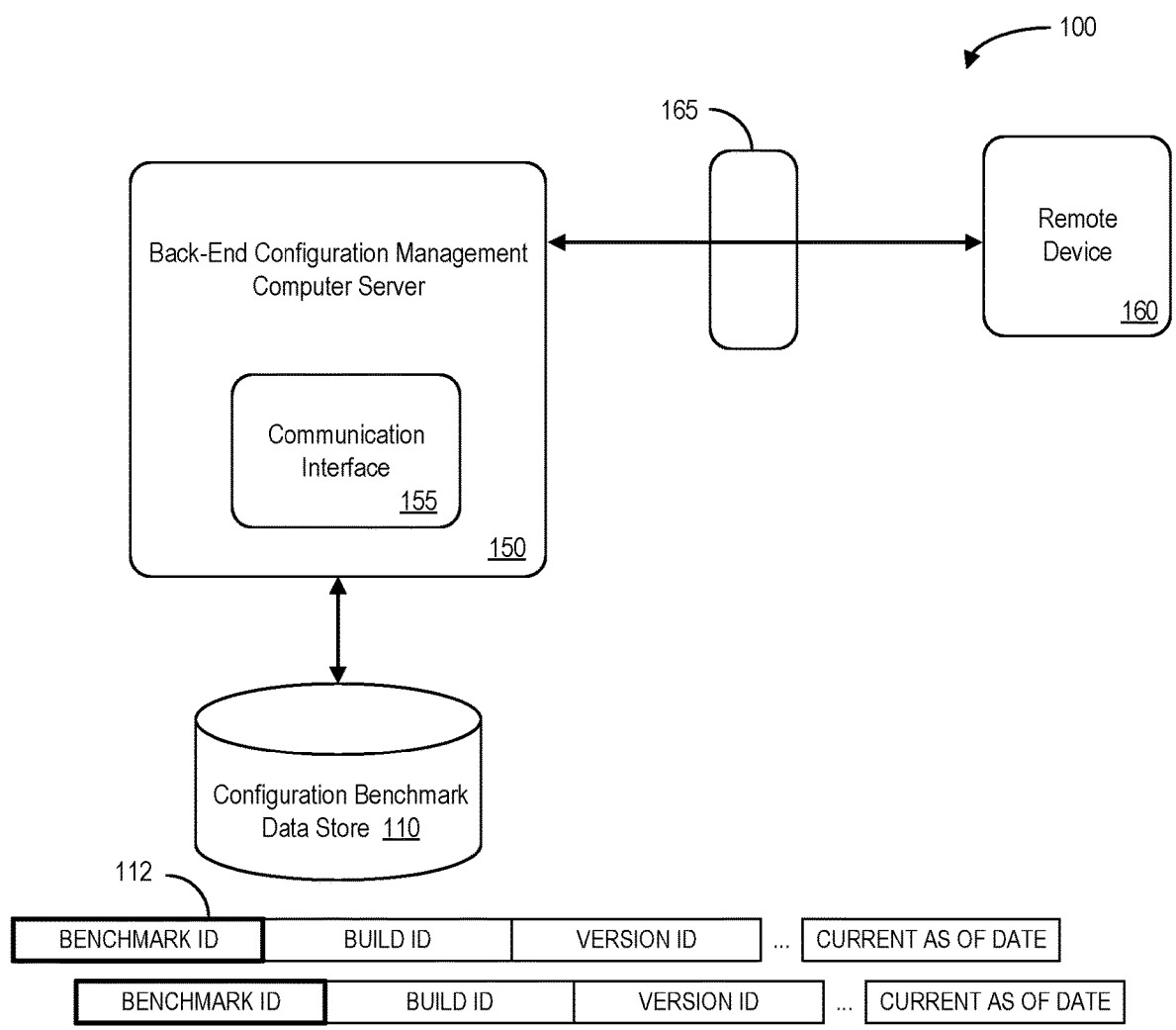
FIG. 1 is a high-level block diagram of a system according to some embodiments.

An enterprise may maintain and utilize a number of different source code module "components" associated with applications used to process business transactions, manage employees and customers, allocate resources (e.g., financial planning), etc. As used herein, the term "component" might refer to, for example, an executable program, a processing element, a software container, etc. Moreover, such components may be periodically modified or updated. It would therefore be desirable to provide systems and methods to automatically facilitate implementation of a secure configuration management strategy in a way that results in an accurate and efficient management of multiple versions, modifications, patches, etc. (and that allows flexibility and effectiveness when new builds are requested and/or updates are made to the system). FIG. 1 is a high-level block diagram of a system 100 according to some embodiments of the present invention. In particular, the system 100 includes a back-end configuration management computer server 150 that may access information in a configuration benchmark data store 110 (e.g., storing a set of electronic records representing benchmark versions of enterprise software). The back-end configuration management computer server 150 may also exchange information with remote devices 160 (e.g., via a firewall 165). According to some embodiments, a communication interface 155 of the back-end configuration management computer server 150 may communicate with the remote devices 160, access information in the configuration benchmark data store 110, and automate builds of enterprise software components. Note that embodiments may be associated with periodic (or asynchronous) types of updates. Further note that the back-end configuration management computer server 150 might also be associated with a third party, such as a vendor or cloud-based implementation that performs a service for an enterprise.

The back-end configuration management computer server 150 might be, for example, associated with a Personal Computer ("PC"), laptop computer, smartphone, an enterprise server, a server farm, and/or a database or similar storage devices. According to some embodiments, an "automated" back-end configuration management computer server 150 may automatically utilize and/or update information in the configuration benchmark data store 110. As used herein, the term "automated" may refer to, for example, actions that can be performed with little (or no) intervention by a human.

As used herein, devices, including those associated with the back-end configuration management computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end configuration management computer server 150 may store information into and/or retrieve information from the configuration benchmark data store 110. The configuration benchmark data store 110 may contain configuration information that was downloaded and/or that was originally input via a remote device 160 (e.g., by an IT employee). The configuration benchmark data store 110 may be locally stored or reside remote from the back-end configuration management computer server 150. As will be described further below, the configuration benchmark data store 110 may be used by the back-end configuration management computer server 150 to automatically coordinate software builds. Although a single back-end configuration management computer server 150 is shown in FIG. 1, any number of such devices may be included. Moreover, various devices described herein might be combined according to embodiments of the present invention. For example, in some embodiments, the back-end configuration management computer server 150 and configuration benchmark data store 110 might be co-located and/or may comprise a single apparatus.

Figure 2:
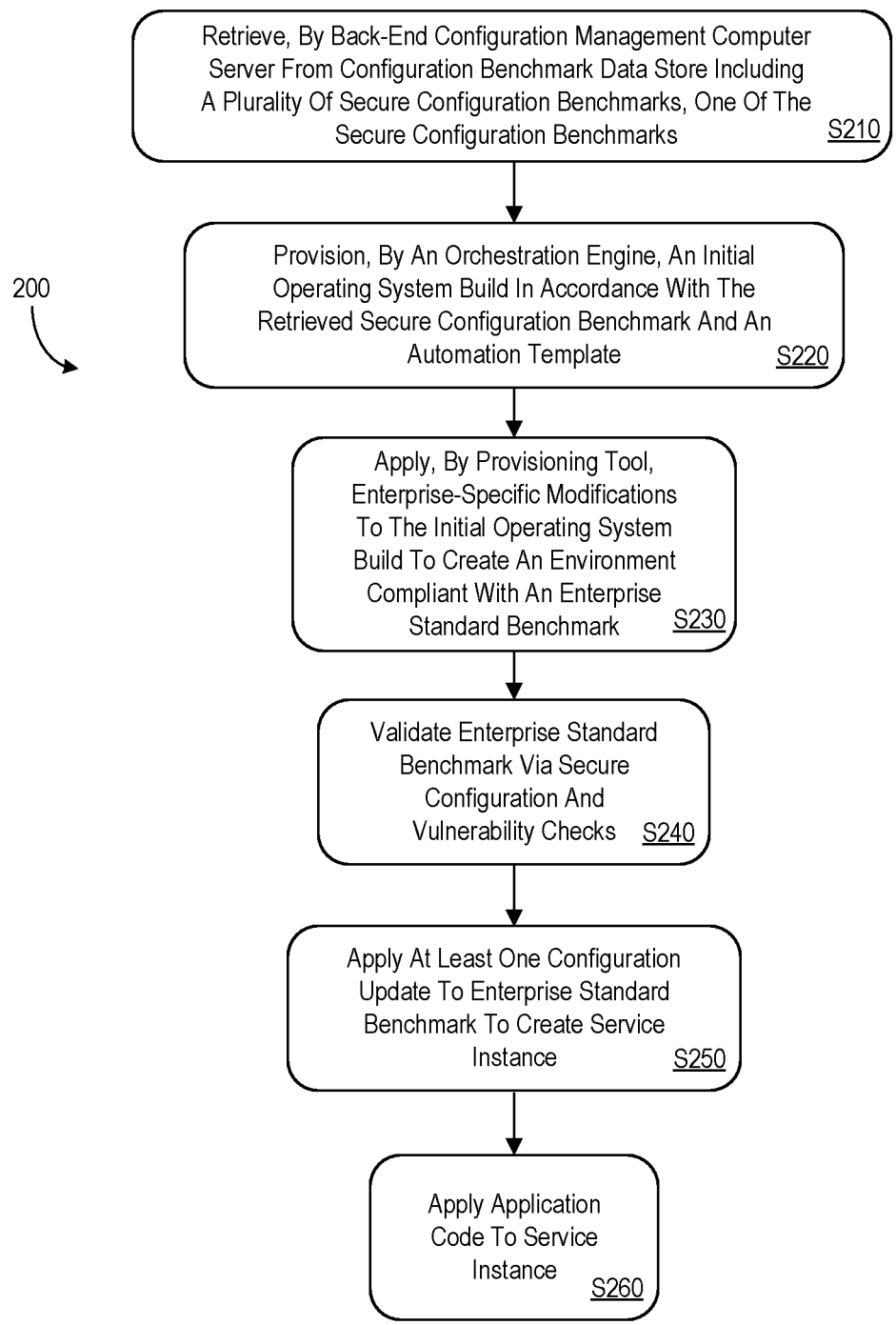
FIG. 2 illustrates a method according to some embodiments of the present invention.

According to some embodiments, the system 100 may automate software builds for an enterprise. Note that the system 100 of FIG. 1 is provided only as an example, and embodiments may be associated with additional elements or components. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end configuration management computer server may retrieve, from a configuration benchmark data store containing a plurality of secure configuration benchmarks, one of the secure configuration benchmarks. The retrieved secure configuration benchmark might be associated with, for example, a Center for Internet Security ("CIS") benchmark, a National Institute of Standards and Technology ("NIST") checklist, a Department of Defense ("DoD") Security Technical Implementation Guide ("STIG"), a vendor recommendation, etc.

At S220, an orchestration engine may provision an initial operating system build in accordance with the retrieved secure configuration benchmark and an automation template. According to some embodiments, an orchestration engine may also provision, in addition to the initial operating system, a web server, middleware, a database, a programming language, an entire technology stack, etc. At S230, a provisioning tool may provision enterprise-specific modifications to the initial operating system build to create an environment compliant with an enterprise standard benchmark. The enterprise standard benchmark might be associated with, for example, infrastructure as a code, IaaS, PaaS, etc.

At S240, the enterprise standard benchmark may be validated via secure configuration and vulnerability checks. At S250, at least one configuration update may be applied to the enterprise standard benchmark to create a service instance, and application code may be applied to the service instance at S260 to create a build (e.g., in response to user request). According to some embodiments, the back-end configuration management computer server may further execute a vulnerability scan to identify security issues and/or continuous monitoring to identify configuration drift issues. The back-end configuration management computer server may also execute, according to some embodiments, a reboot/refresh and/or decommission processes.

Figure 3:
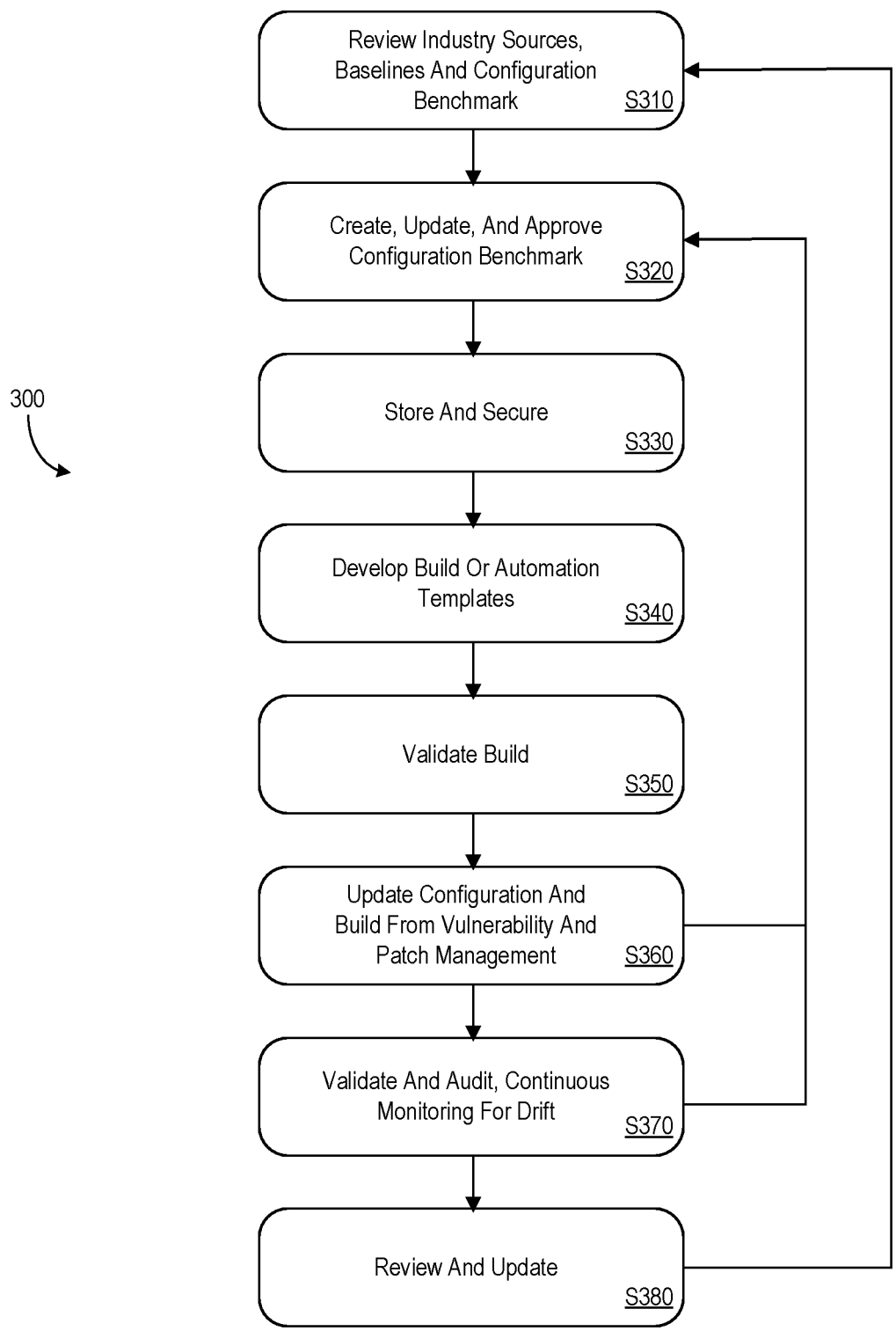
FIG. 3 is a high-level secure configuration management process in accordance with some embodiments.

FIG. 3 is a high-level secure configuration management process 300 in accordance with some embodiments. At S310, an enterprise may review industry sources, baselines, and/or configuration benchmarks. These might include, for example, base configurations on industry-accepted standards such as a technology vendor security benchmark, CIS benchmarks, an NIST special publication (e.g., 800-70), a DoD STIG, etc. Configuration values may be adjusted to address, for example, enterprise policies, inherent risk (e.g., regulatory or Confidentiality, Integrity and Availability ("CIA") requirements of critical data), technology capabilities (e.g., to enable capabilities to meet business requirements), performance goals (e.g., to maintain a level of performance to meet business requirements), etc.

At S320, the enterprise may create, update, and/or approve the configuration benchmark. At S330, the configuration benchmark may be stored and secured. For example, the enterprise may protect a configuration benchmark from un-authorized changes with version controls and management. At S340, the enterprise may develop build and/or automation templates (e.g., automation jobs may be updated when configuration changes are made). At S350, the enterprise may validate the build. According to some embodiments, an automated validation process may ensure that a system "as built" is in complete compliance with benchmark and baseline requirements.

At S360, the enterprise may update the configuration and build based on vulnerabilities and a patch management process. Any identified issues may then be processed at S320. This may help ensure that configurations and builds are modified as necessary to address vulnerabilities and align the system with current patch levels. At S370, the enterprise may validate, audit, and/or continuously monitor for configuration drift (and any identified issues may be processed at S320). According to some embodiments, changes varying from the baseline and benchmark (e.g., "drift") and file integrity issues may be examined for a root cause. The enterprise may then identify and generate a report indicating if the changes are authorized or unauthorized (and remediation/incident response may be performed as necessary). According to some embodiments, a File Integrity Management ("FIM") internal control or process may validate the integrity of Operating System ("OS") and application software files using a verification method between the current file state and a known, good baseline. At S380, the enterprise may review and update the build as appropriate. For example, an annual review may have IT employees update and sign-off on the build, and the process may then repeat at S310.

Thus, embodiments may achieve a corporate security baseline for systems including a technology independent directive reflecting corporate security controls that are updated as appropriate. For example, the NIST cyber-security framework NIST SP800-53 may transition to NIST 2018-2019. The enterprise may start with a "plain" or "vanilla" version sourced from (in order of reference): CIS benchmarks; NIST checklists; a DoD STIG; and vendor recommendations. Moreover, an enterprise-specific standard baseline benchmark may provide tailored configurations to meet requirements for that particular enterprise (e.g., associated with policies and conditional controls based on inherent risk scores for that enterprise).

Embodiments may also achieve a secure configuration benchmark for new technologies and/or benchmarks that are annually refreshed. Note that technology specific configuration settings may need to comply with an enterprise baseline and/or be able to programmatically validate. Specific enterprise modifications may require approval from appropriate IT personnel (e.g., authorized "exceptions" might be required for deviations from an approved set of enterprise modifications). For example, server configurations needed for a Structured Query Language ("SQL") database might need additional modifications to support Sarbanes-Oxley Act reporting, Pay Card Industry ("PCI") requirements, etc.

Figure 4:
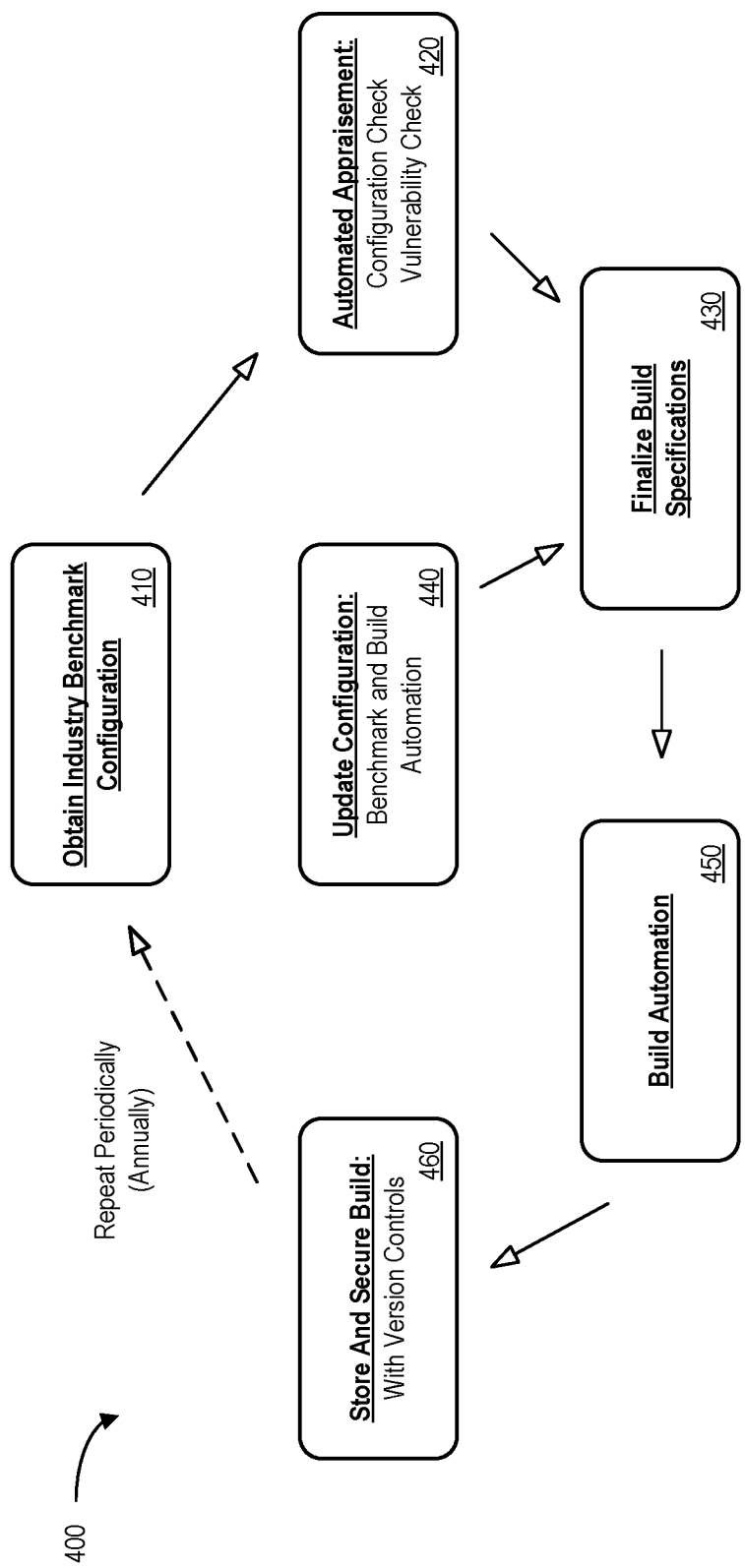
FIG. 4 illustrates an automated secure configuration management process utilizing a benchmark according to some embodiments.

FIG. 4 illustrates an automated secure configuration management process 400 utilizing a benchmark according to some embodiments. After an industry benchmark configuration is obtained at 410, an automated appraisement process may be performed at 420 including configuration and validation checks. The appraisement process 420 might, for example, identify variations between a current build and a new industry benchmark. According to some embodiments, the appraisement process 420 may identify and remediate vulnerabilities above pre-defined thresholds in a new build specification. The results of the appraisement process 420 may then be used to finalize a build specification 430. This might involve, for example, a reviewing differences, identifying required build changes, documenting the rational for the differences, and/or obtaining approvals as appropriate (e.g., from an IT employee). According to some embodiments, the results an update configure process 440 (e.g., associated with benchmark and/or build automation) may also be used in connection with the finalization process 430 (and may be repeated as needed for patches and configuration updates).

An automated build automation process 450 may then be performed to develop a prototype appraisement, execute a configuration check, and/or perform a vulnerability check. The build automation process 450 may, for example, confirm that a prototype "as built" is the same as an approved benchmark, confirm that prototype vulnerabilities were addressed, etc. At 460, the enterprise may automatically store and secure the build with version controls. According to some embodiments, versioning for build configuration patches may be implemented along with a version "signature" on the build instance (e.g., as stored in a configuration management database). The process 400 may be repeated on a periodic basis (e.g., quarterly or annually).

Figure 5:
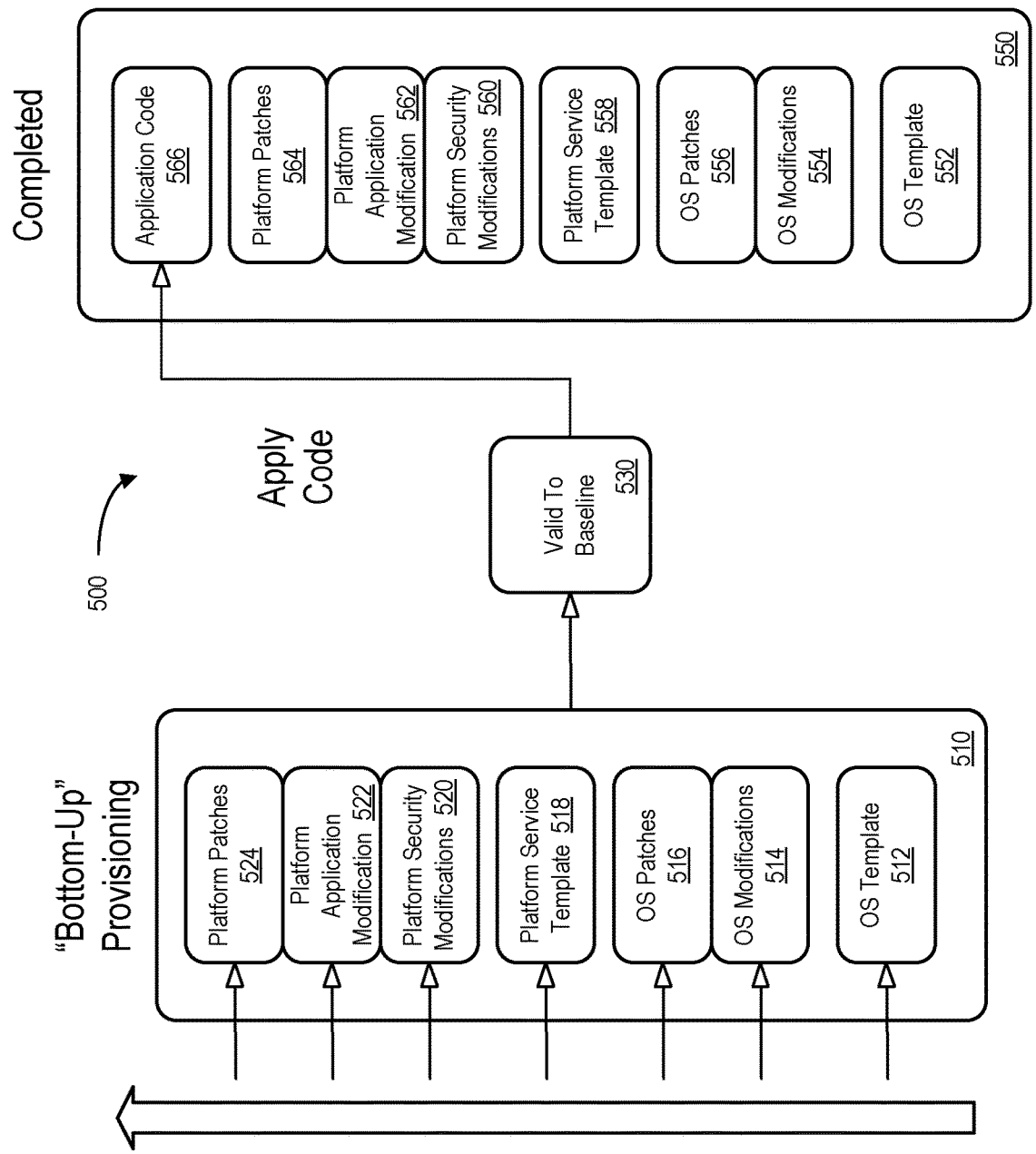
FIG. 5 illustrates provisioning with baselines and benchmarks in accordance with some embodiments.

FIG. 5 illustrates provisioning 500 with baselines and benchmarks in accordance with some embodiments. According to some embodiments, "bottom-up" provisioning 510 may be performed in the following sequence: OS template 512, OS modification 514, OS patches 516, platform service template 518 for an enterprise standard benchmark, platform security modifications 520, platform application modification 522, and platform patches 524. A completely build instance 550 would similarly include: OS template 552, OS modification 554, OS patches 556, platform service template 558 for an enterprise standard benchmark, platform security modifications 560, platform application modification 562, and platform patches 564. When a validation to baseline 530 is confirmed application code 566 may be applied to the completed instance 550.

According to some embodiments, a naming convention may be provided for automated builds. Note that labeling host instances with build names may allow for identification of builds with defects, builds with software that needs to be replaced, upgraded or patched, etc. For example, a back-end configuration management computer server may implement a naming convention for an automated build instance to provide version control. The naming convention might include, for example: an application build identifier, a version, current as of date information, a security modification identifier, a benchmark version, a benchmark source, etc. Such a naming convention may, according to some embodiments, provide the ability to risk rank and prioritize remediation or upgrade efforts for an enterprise.

Some embodiments may store benchmarks with naming conventions and version control that includes build identifier labelling on instances and may be leveraged for Continuous compliance. By way of example only, Table I sets forth naming conventions might be provided for various layers:

TABLE I

| Layer | Naming Convention |
| --- | --- |
| Application Code | AppBuildID |
| Application Patches | Label.Tech.TechVer.CurrentasofDate |
| Platform Application Enterprise Modifications | Label.Tech.TechVer.ApplIDMod.ApplIDModVer |
| Platform Security Enterprise Modifications | Label.Tech.TechVer.SecurityMod.SecurityModVer |
| Platform Service Template: Enterprise Standard Benchmark | Label.Tech.TechVer.BenchmarkSource.BenchmarkVer |
| OS Patches | Label.Tech.TechVer.CurrentasofDate |
| OS Security Enterprise Modifications | Label.Tech.TechVer.SecurityMod.SecurityModVer |
| OS Template: Enterprise Standard Benchmark | Label.Tech.TechVer.BenchmarkSource.BenchmarkVer |

According to some embodiments, the layer name may be "emblazoned" on an instance as last step of provisioning before validation. Such a naming convention may let vulnerabilities be identified and/or allow for analysis to a root cause. For example, a name might identify where a problem exists (what benchmark component, what layer) and let an investigation track the problem back to a build or layer identifier. He or she can then fix the vulnerability in the build as necessary, update the benchmark, identify and apply patches, update a build automation, fix vulnerabilities in instances by priority (e.g., discover where a build is deployed and rollout a new build for the most important problems.

Such a naming convention may, according to some embodiments, be used to efficiently search a deployment population to identify members that need to be updated. For example, an operator, administrator, or automated process might search for a particular build in a population that includes hundreds of servers. This approach may improve defect/build management procedures (e.g., because problems can be identified and localized to deployed systems that have a known vulnerability, and those systems can be updated before the problem would have been detected via a periodic scan).

Some embodiments may provide baseline and benchmark exception management such that risk is accepted, and variance is approved to develop new enterprise modifications based on approved variances (that is, consumption of a new enterprise modification may require IT approval). Some embodiments may track approved usage through a configuration management database and/or manage a continuous compliance check against approved variances for enterprise modification (rather than the enterprise standard benchmark).

Figure 6:
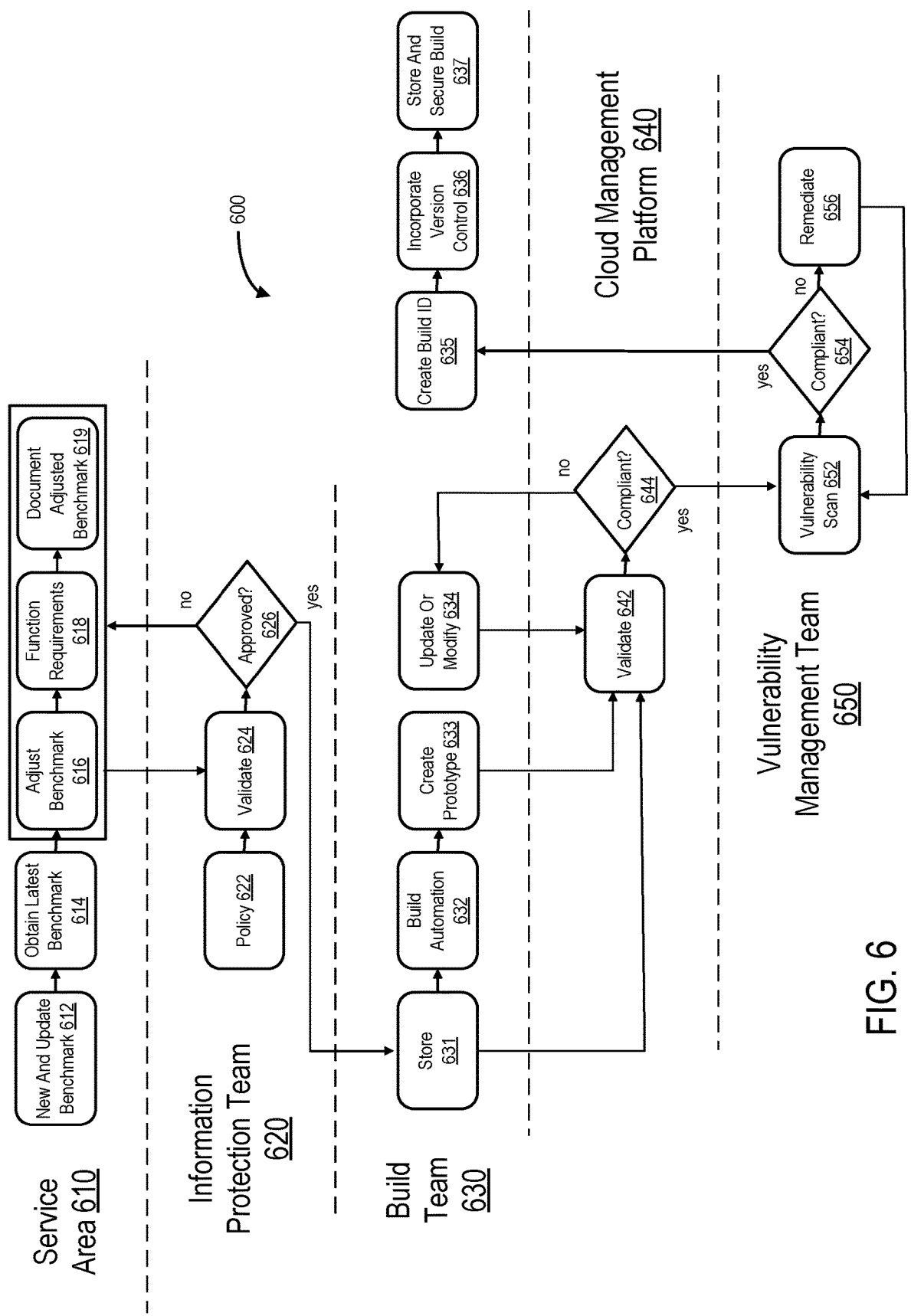
FIG. 6 is an information flow diagram for a build creation process according to some embodiments.

FIG. 6 is an information flow diagram 600 for a build creation process according to some embodiments. At 612, a service area 610 may select a new and/or updated benchmark. The latest benchmark may then be obtained for the technology at 614. The service area 610 may then perform some or all of the following: adjust the benchmark in line with enterprise information protection team 620 requirements at 616; adjust the benchmark with functionality requirements at 618; and document the adjusted benchmark at 619.

The information protection team 620 may use appropriate policies 622 to validate the adjusted benchmark for the technology at 624. If not approved at 626, the service area 610 may further adjust the benchmark as appropriate. If approved at 626, a build team 630 may store the approved benchmark in a secure location at 631 and execute a build automation at 632 to create a prototype 633. A cloud management platform 640 may the validate the configuration at 642 against the stored version 631. If the configuration is not compliant at 644, the build team 630 may update or modify the prototype in line with the approved benchmark at 634 and the process may repeat. If the configuration is compliant at 644, a vulnerability management team 650 may execute a vulnerability scan at 652 for patch and unwanted port, protocols, etc. If the vulnerability scan is not compliant at 654, the vulnerability management team 650 may remediate the non-compliances at 656 and the process may repeat. If the vulnerability scan is compliant at 654, the build team 630 creates a build identifier at 635, incorporates version control at 636, and securely stores the build at 637 for use.

Figure 7:
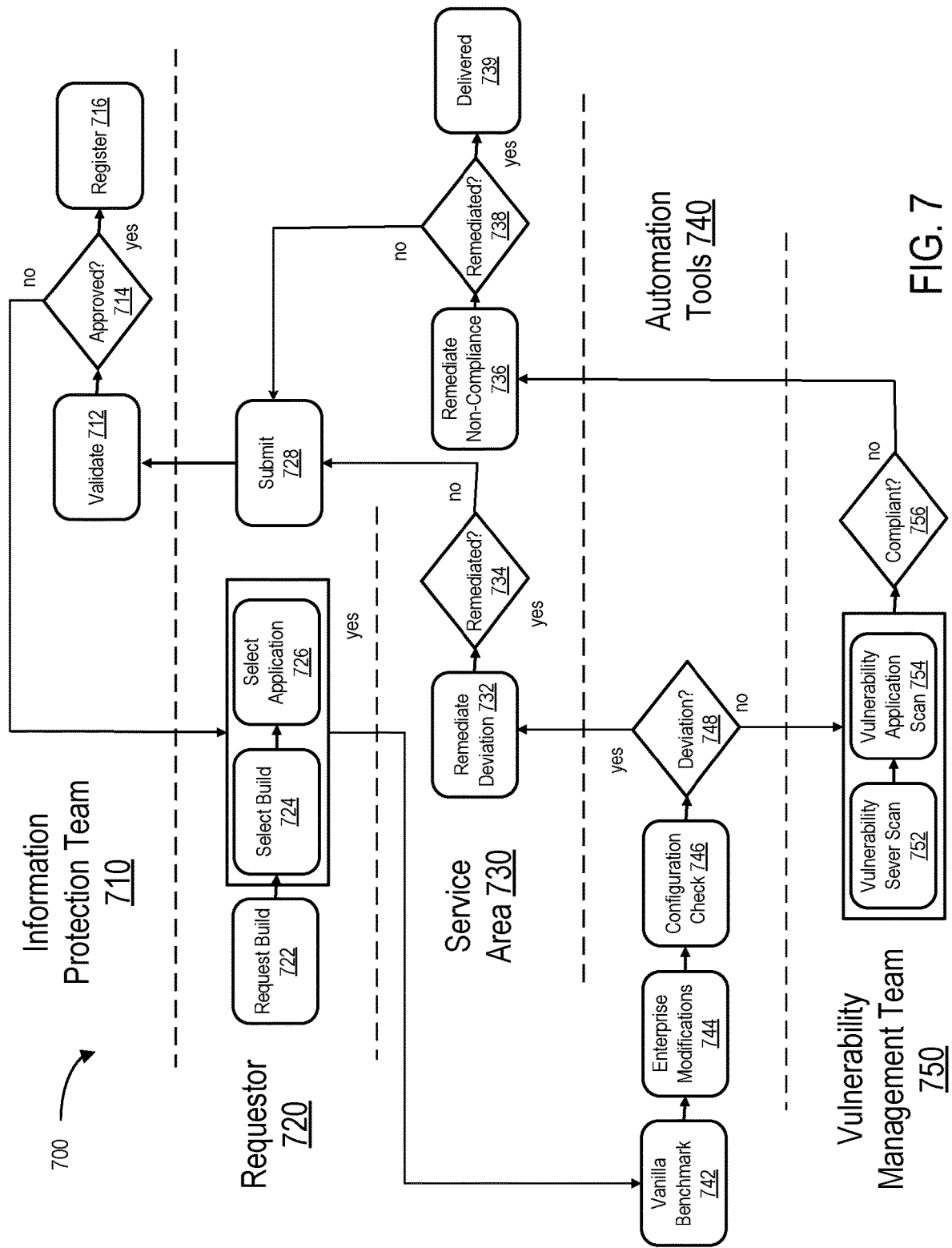
FIG. 7 is an information flow diagram for a provisioning process in accordance with some embodiments.

FIG. 7 is an information flow diagram 700 for a provisioning process in accordance with some embodiments. At requestor 720 may request a build at 722 by selecting the latest build at 724 along with an application based on a business requirement at 726. Automation tools 740 may then create a plain or "vanilla" benchmark at 742, apply enterprise modifications at 744, and perform a configuration check at 746 to validate the approved build.

If there is a deviation from the configuration check at 748, a service area 730 will remediate the deviation at 732. If the deviation is not remediated at 734, the requestor submits the exception with a detailed justification to an information protection team 710. If the information protection team 710 validates 712 and approves the submitted deviation at 714, it is registered in a non-compliance risk register at 716. If the information protection team 710 does not validate 712 and approve the submitted deviation at 714, the requestor 720 may select another build.

The automation tool 742 had instead found that there was no deviation at 748, a vulnerability management team 750 executes a vulnerability scan for a server 752 and application 754. If these are found to be compliant at 754, the process ends (and the build is safe). If these are found to be non-compliant at 754, the service area 730 attempts to remediate the non-compliance at 736. If the non-compliance is remediated at 738, the build is delivered at 739. If the non-compliance is not remediated at 738, the requester 720 may detail and submit the exception to the information processing team 710 at 728.

Figure 8:
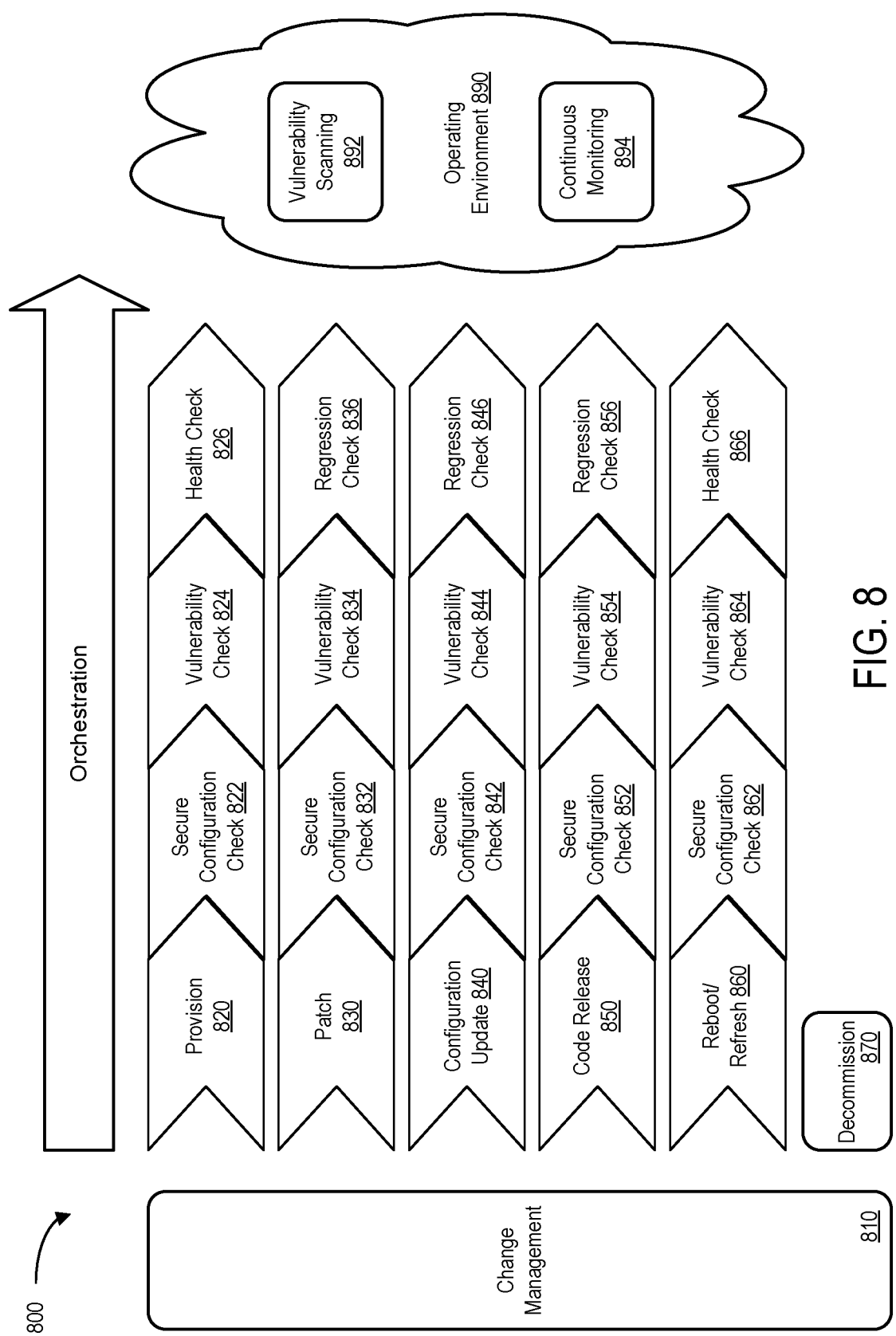
FIG. 8 is a system to facilitate secure configuration and vulnerability assurances according to some embodiments.

FIG. 8 is a system 800 to facilitate secure configuration and vulnerability assurances according to some embodiments. A change management process 810 may initially install a provision 820. An orchestration process may manage the lifecycle of a service "instance" by performing a secure configuration check 822 (and the instance will only move forward if the "as built" is compliant with a baseline). The orchestration process may then perform a vulnerability check 824 (and the instance will only move forward only if the vulnerability scan meets threshold requirements). The orchestration process may then perform a health check 826 (and the instance will only move forward if the health test is passed). That is, any issues discovered by the orchestration process must be resolved before the system moves forward.

Once the provision 820 is approved to initiate the lifecycle of a system, the change management process 810 may periodically install patches 830 as appropriate. As before, the orchestration process may perform a secure configuration check 832, a vulnerability check 834, and a regression check 836 (and the instance will only move forward if all checks are passed). When required, the change management process 810 may also install one or more configuration updates 840, and, the orchestration process may perform a secure configuration check 842, a vulnerability check 844, and a regression check 846 (and the instance will only move forward if all checks are passed). Similarly, the change management process 810 may install code releases (and/or software may be installed or uninstalled) 850 when available, and, the orchestration process may perform a secure configuration check 852, a vulnerability check 854, and a regression check 856 (and the instance will only move forward if all checks are passed).

According to some embodiments, the change management process 810 may also perform a reboot/refresh process 860 (to bring a system down and then back up). This may likewise involve the orchestration process performing a secure configuration check 862, a vulnerability check 864, and a health check 866. Moreover, the change management process 810 may eventually handle a decommission 870 process to retire an instance at the end of the lifecycle.

The instance may execute in an operating environment 890 according to some embodiments. The operating environment 890 might include, for example, vulnerability scanning 892 so that "zero day" or newly identified issues may be found. The operating environment 890 might also include, according to some embodiments, continuous monitoring 894 to detect "drift" (e.g., issues attributed to "unauthorized" changes).

Figure 9:
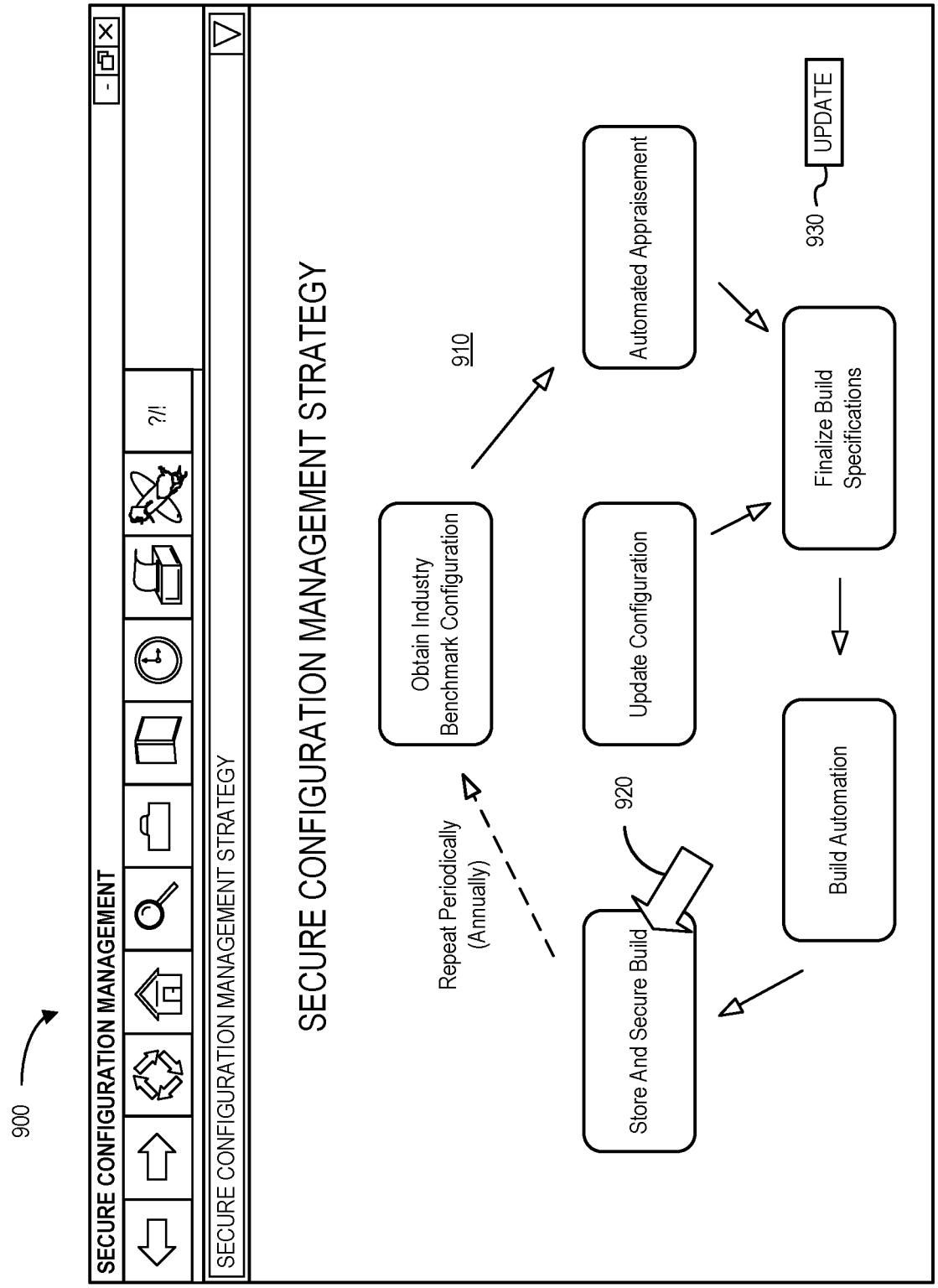
FIG. 9 is a configuration management user display in accordance with some embodiments.

FIG. 9 is a configuration management user display 900 in accordance with some embodiments. The display 900 might include a graphical depiction 910 of elements of the configuration management system. Selection of an element (e.g., by touchscreen or computer mouse pointer 920) may result in the display of additional information about that element (e.g., via a pop-up window) and/or let an operator or administrator adjust parameters associated with the element (e.g., selecting a different benchmark configuration, requesting a build exception). According to some embodiments, selection of an "update" icon 930 may cause the system to refresh a configuration management process (e.g., to look for new patches, drift issues, etc.).

Figure 10:
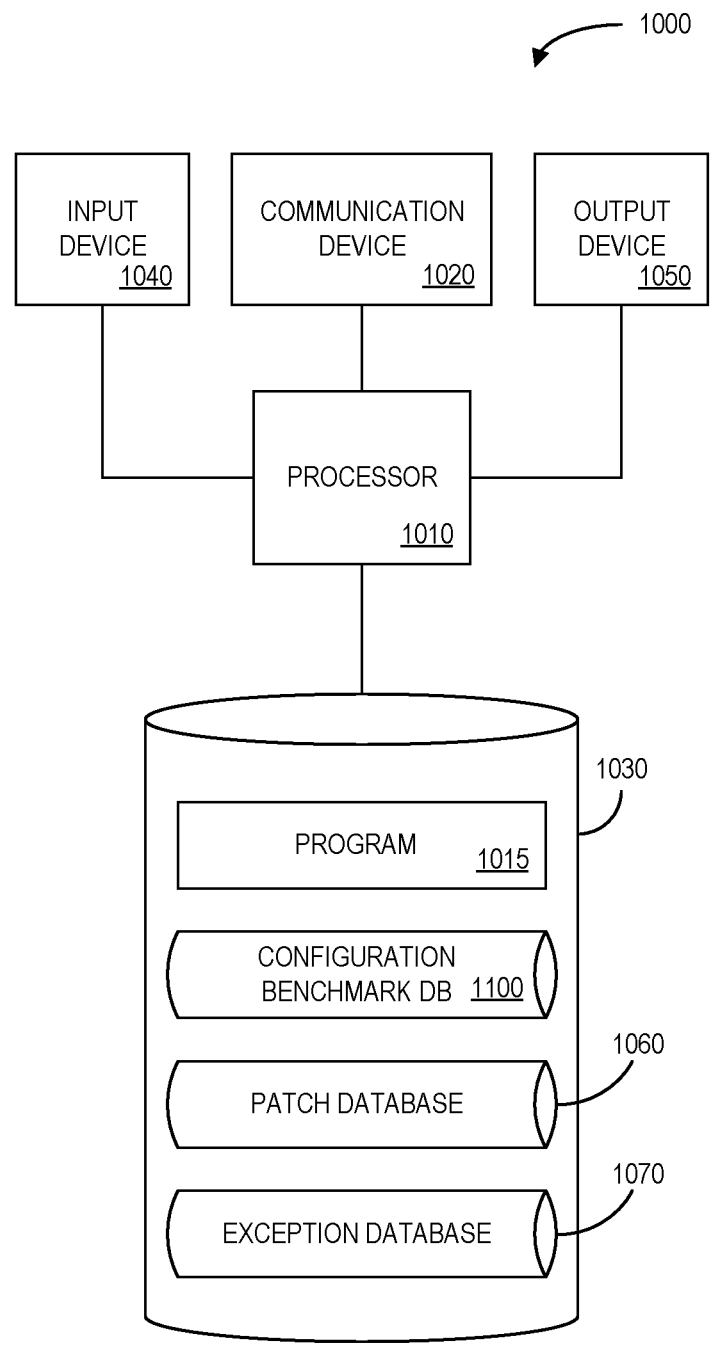
FIG. 10 is a block diagram of an apparatus in accordance with some embodiments of the present invention.

Embodiments described herein may comprise a tool to automate secure configuration management for an enterprise and may be implemented using any number of different hardware configurations. For example, FIG. 10 illustrates a back-end configuration management computer server 1000 that may be, for example, associated with the system 100 of FIG. 1. The back-end configuration management computer server 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote devices (e.g., PCs and smartphones). Note that communications exchanged via the communication device 1020 may utilize security features, such as those between a public internet user and an internal network of an insurance enterprise. The security features might be associated with, for example, web servers, firewalls, and/or PCI infrastructure. The back-end configuration management computer server 1000 further includes an input device 1040 (e.g., a mouse and/or keyboard to enter information about enterprise configuration, legacy systems, etc.) and an output device 1050 (e.g., to output error messages, generate reports regarding build status, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1015 and/or a dispatch tool or application for controlling the processor 1010. The processor 1010 performs instructions of the program 1015, and thereby operates in accordance with any of the embodiments described herein. For example, the processor 1010 may retrieve a secure configuration benchmark and provision, via an orchestration engine, an initial operating system build in accordance with the retrieved secure configuration benchmark and an automation template. The processor 1010 may then apply, via a provisioning tool, enterprise-specific modifications to the initial operating system build to create an environment compliant with an enterprise standard benchmark. The processor 1010 may validate the enterprise standard benchmark via secure configuration and vulnerability checks, apply at least one configuration update to the enterprise standard benchmark to create a service instance, and then apply application code to the service instance.

The program 1015 may be stored in a compressed, uncompiled and/or encrypted format. The program 1015 may furthermore include other program elements, such as an operating system, a database management system, and/or device drivers used by the processor 1010 to interface with peripheral devices.

As used herein, information may be "received" by or "transmitted" to, for example: (i) the back-end configuration management computer server 1000 from another device; or (ii) a software application or module within the back-end configuration management computer server 1000 from another software application, module, or any other source.

In some embodiments (such as shown in FIG. 10), the storage device 1030 further stores a configuration benchmark database 1100, a patch database 1060 (e.g., storing OS and application patches), and an exception database 1070 (e.g., storing reasons why particular non-compliant builds were allowed in the past). An example of a database that might be used in connection with the back-end configuration management computer server 1000 will now be described in detail with respect to FIG. 11. Note that the database described herein is only an example, and additional and/or different information may be stored therein. Moreover, various databases might be split or combined in accordance with any of the embodiments described herein. For example, the configuration benchmark database 1100 and/or exception 1070 might be combined and/or linked to each other within the program 1015.

Figure 11:
FIG. 11 is a portion of a tabular configuration benchmark database in accordance with some embodiments.

Referring to FIG. 11, a table is shown that represents the configuration benchmark database 1100 that may be stored at the back-end configuration management computer server 1000 according to some embodiments. The table may include, for example, entries identifying vanilla configuration benchmarks (and potential modification) that might be approved by an enterprise. The table may also define fields 1102, 1104, 1106, 1108, 1110, 1112, 1114 for each of the entries. The fields 1102, 1104, 1106, 1108, 1110, 1112, 1114 may, according to some embodiments, specify: a configuration benchmark identifier 1102, origin 1104, a date and time 1106, OS patches 1108, enterprise modifications 1110, a name 1112, and approved exceptions 1114. The configuration benchmark database 1100 may be created and updated, for example, based on information electrically received from remote devices (e.g., a new OS is released, patches are updated, exceptions are approved, etc.).

The configuration benchmark identifier 1102 may be, for example, a unique alphanumeric code identifying a configuration benchmark that has been approved by an enterprise. The origin 1104 is indicate the basis for the benchmark (e.g., CIS, NIST, or STIG) and date and time 1106 may indicate when the benchmark was approved. The OS patches 1108 and enterprise modifications 1110 may include files or links to pre-approved changes to the benchmark. The name 1112 may follow a naming convention as described in connection with Table I. The approved exceptions 1114 may include a detailed justification of why one or more non-compliant issues were allowed.

Thus, embodiments may provide an automated and efficient way to coordinate secure configurate management for an enterprise. This may help reduce an amount of time required to implement new enterprise features, reduce security vulnerabilities, identify unintended "drifts" away from approved configurations, etc. Such an approach may provide a consistent lifecycle process for secure configurations and approved deviations and minimize security decay as services are updated or patched. Exceptions may be easily identified traceability may be provided from approvals to build to implementation. An enterprise may achieve version control for approved builds and record build naming conventions on instances. Embodiments may thus provide an audit trail for approved configurations for IaaS and PaaS layers (e.g., through traceability) as well as visibility into a population of instances with identified vulnerabilities (e.g., via trace-back-to-build features).

By using a mature provisioning and change process to execute configuration checks and vulnerability checks, embodiments may save time and improve accuracy while providing assurance that instances meet standards prior to operational release. Increased maturity through sustainable governance may also improves operations stability and compliance.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of software components, embodiments may instead be associated with other types of code files.

Although particular build automations and/or provisioning requirement have been described, embodiments may be associated variations thereon. For example, enterprise modification may be applied after a baseline is validated (and a final build validation may occur after enterprise modifications are applied). In some embodiments, before any build or image is delivered, validation is performed to make sure it was constructed appropriately. If not, it doesn't meet the benchmark and the build or image may be destroyed and rebuilt. In some cases, an enterprise may want the ability to keep failed builds to discover what went wrong (and how to improve the system).

With respect to a baseline benchmark (CIS Benchmark, STIG, etc.) a server image template may be as vanilla as possible with enterprise modification configurations being applied when the server is live. This allows for configurations to be applied regardless of where the source image template comes from (e.g., a private or public cloud). According to some embodiments, a configuration benchmark may be derived from existing templates as opposed to being custom built from scratch.

Enterprise modification configurations may be able to be applied regardless of landing zone. More restricted baseline benchmarks may be applied to builds deployed to higher inherent risk areas such as PCI and DMZ. Moreover, all workloads may be authenticated by Active Directory and should be joined to Active Directory when possible. If not, a suitable alternative may be utilized.

With respect to continuous compliance for drift requirements, scans may be done on regular frequent intervals based on business risk ranking so as to catch deviations. Embodiments may have the ability to scan and report with a daily frequency and/or to report without enforcing. Note that report on compliance might be implemented with a relatively minimal amount of effort (e.g., all component settings might not need to be scanned for, instead only the successful application of the pertinent components may be required). Embodiments might also provide an ability to automatically re-apply secure configuration when drift has occurred or automatically create an action ticket for later remediation. According to some embodiments, if immediate remediation is not possible, non-compliance may be remediated within X days for critical risk deviations and Y days for less severe deviations (with X being less than Y). Some embodiments may also provide an ability to report on the success and failure of applied configurations and patches and/or a dashboard view of secure configuration health.

Figure 12:
FIG. 12 illustrates a handheld tablet device displaying a configuration management display according to some embodiments.

Still further, the displays and devices illustrated herein are only provided as examples, and embodiments may be associated with any other types of user interfaces. For example, FIG. 12 illustrates a handheld touchscreen tablet computer 1200 with a secure configuration management strategy display 1210 according to some embodiments. In particular, the display 1210 includes selection areas 1220 that might be used by an operator or administrator to modify parameters for an OS template, OS modification, OS patches, platform security modification, application code, etc.

Figure 13:
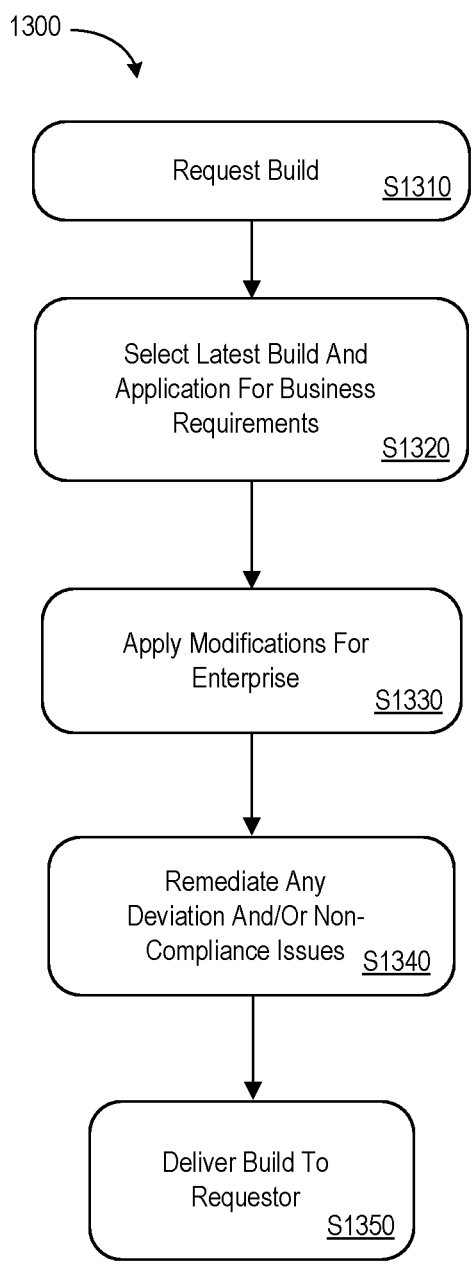
FIG. 13 illustrates an overall business enterprise workflow in accordance with some embodiments.

Note that embodiments described herein might be used in connection with a number of different types of business process flows. For example, FIG. 13 illustrates an overall process 1300 that might be associated with an enterprise in accordance with some embodiments. At S1310, a party might request a build (e.g., a party might request a SQL database to support purchase order processing. At S1320, the latest build and application for business requirements may be determined. At S1330, modification are applied for the enterprise in an automated fashion. At S1340, and deviations or non-compliance issues may be remediated. At S1350, the secure build may be delivered to the requestor. The requestor might then use the build, for example, to facilitate purchase order processing.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to manage a secure configuration management strategy for an enterprise via an automated back-end configuration management computer server, comprising:
   (a) a configuration benchmark data store including a plurality of secure configuration benchmarks;
   (b) a communication interface to facilitate an exchange of electronic messages, including messages exchanged via a distributed communication network, supporting interactive user interface displays at remote user devices; and
   (c) the back-end configuration management computer server, coupled to the configuration benchmark data store and the communication interface, programmed to:
      (i) retrieve one of the secure configuration benchmarks,
      (ii) provision, by an orchestration engine, an initial operating system software build in accordance with the retrieved secure configuration benchmark and an automation template,
      (iii) apply, by a provisioning tool, enterprise-specific modifications to the initial operating system software build to create an environment compliant with an enterprise standard benchmark,
      (iv) validate the enterprise standard benchmark via secure configuration and vulnerability checks,
      (v) apply at least one configuration update to the enterprise standard benchmark to create a software service instance,
      (vi) apply application code to the software service instance;
      (vii) label the software service instance with a build name according to a naming convention that includes an application build identifier, a version, current as of date information, a security modification identifier, a benchmark version, and a benchmark source;
      (viii) execute a reboot and refresh process; and
      (ix) execute a risk rank process to prioritize software remediation efforts by the enterprise based on said build name;
         wherein the retrieved secure configuration benchmark is associated with at least one of: a national institute of standards and technology checklist, and a department of defense security technical implementation guide.

2. The system of claim 1, wherein the orchestration engine is further to provision, in addition to the initial operating system, at least one of: (i) a web server, (ii) middleware, (iii) a database, (iv) a programming language, and (v) an entire technology stack.

3. The system of claim 1, wherein the enterprise standard benchmark is associated with at least one of: (i) infrastructure as code cloud provisioning, (ii) an infrastructure as a service, and (iii) a platform as a service.

4. The system of claim 1, wherein the back-end configuration management computer server is further to execute a vulnerability scan to identify security issues.

5. The system of claim 1, wherein the back-end configuration management computer server is further to execute continuous monitoring to identify configuration drift issues.

6. The system of claim 1, wherein the back-end configuration management computer server is further to execute a decommission process.

7. A computerized method to manage a secure configuration management strategy for an enterprise via an automated back-end configuration management computer server, comprising:
   retrieving, by the back-end configuration management computer server from a configuration benchmark data store including a plurality of secure configuration benchmarks, one of the secure configuration benchmarks;
   provisioning, by an orchestration engine, an initial operating system software build in accordance with the retrieved secure configuration benchmark and an automation template;
   applying, by a provisioning tool, enterprise-specific modifications to the initial operating system software build to create an environment compliant with an enterprise standard benchmark;
   validating the enterprise standard benchmark via secure configuration and vulnerability checks;
   applying at least one configuration update to the enterprise standard benchmark to create a software service instance;
   applying application code to the software service instance;
   labeling the software service instance with a build name according to a naming convention that includes an application build identifier, a version, current as of date information, a security modification identifier, a benchmark version, and a benchmark source;
   executing a reboot and refresh process; and executing a risk rank process to prioritize software remediation efforts by the enterprise based on said build name;
 wherein the retrieved secure configuration benchmark is associated with at least one of: a national institute of standards and technology checklist, and a department of defense security technical implementation guide.

8. The method of claim 7, wherein the orchestration engine is further to provision, in addition to the initial operating system, at least one of: (i) a web server, (ii) middleware, (iii) a database, (iv) a programming language, and (v) an entire technology stack.

9. The method of claim 7, wherein the enterprise standard benchmark is associated with at least one of: (i) infrastructure as code cloud provisioning, (ii) an infrastructure as a service, and (iii) a platform as a service.

10. The method of claim 7, wherein the back-end configuration management computer server is further to execute a vulnerability scan to identify security issues.

11. The method of claim 7, wherein the back-end configuration management computer server is further to execute continuous monitoring to identify configuration drift issues.

12. A non-transitory, computer-readable medium storing program code, the program code executable by a computer processor of an automated back-end configuration management computer server to cause the computer processor to perform a method to manage a secure configuration management strategy for an enterprise, comprising:
 retrieving, by the back-end configuration management computer server from a configuration benchmark data store including a plurality of secure configuration benchmarks, one of the secure configuration benchmarks;
 provisioning, by an orchestration engine, an initial operating system software build in accordance with the retrieved secure configuration benchmark and an automation template;
 applying, by a provisioning tool, enterprise-specific modifications to the initial operating system software build to create an environment compliant with an enterprise standard benchmark;
 validating the enterprise standard benchmark via secure configuration and vulnerability checks;
 applying at least one configuration update to the enterprise standard benchmark to create a software service instance;
 applying application code to the software service instance;
 labeling the software service instance with a build name according to a naming convention that includes an application build identifier, a version, current as of date information, a security modification identifier, a benchmark version, and a benchmark source;
 executing a reboot and refresh process; and
 executing a risk rank process to prioritize software remediation efforts by the enterprise based on said build name;
 wherein the retrieved secure configuration benchmark is associated with at least one of: a national institute of standards and technology checklist, and a department of defense security technical implementation guide.

13. The medium of claim 12, wherein the orchestration engine is further to provision, in addition to the initial operating system, at least one of: (i) a web server, (ii) middleware, (iii) a database, (iv) a programming language, and (v) an entire technology stack.

14. The medium of claim 12, wherein the back-end configuration management computer server is further to execute a decommission process.

* * * * *